United States Patent [19]

Loris

[11] 4,024,316

[45] May 17, 1977

[54] INSULATED SAFETYSIZED EQUIPMENT

[76] Inventor: Joe Loris, Box 1202, Mansfield, Ohio 44903

[22] Filed: Jan. 22, 1976

[21] Appl. No.: 651,341

[52] U.S. Cl. .................. 428/409; 428/462; 428/463; 428/465; 428/515; 428/518; 428/520; 428/522; 428/913

[51] Int. Cl.² ............... B32B 25/08; B32B 25/18; B32B 27/30

[58] Field of Search .................. 428/461–463, 428/465, 515, 518, 520, 522, 38, 46, 913, 409

[56] References Cited

UNITED STATES PATENTS

| | | | |
|---|---|---|---|
| 2,174,912 | 10/1939 | Thielking | 428/461 X |
| 2,427,196 | 9/1947 | Cox | 428/461 X |
| 2,717,216 | 9/1955 | Arone | 428/461 X |
| 2,722,492 | 11/1955 | Ralston | 428/461 X |
| 2,823,140 | 2/1958 | Lowell | 428/461 X |
| 2,950,222 | 8/1960 | Hinson | 428/461 X |
| 3,776,805 | 12/1973 | Hansen | 428/913 X |
| 3,987,229 | 10/1976 | Rairdon et al. | 428/463 X |

OTHER PUBLICATIONS

Modern Plastics, Aug. 1946, "Piping Light with Acrylic Materials", H. Pearson (Rohm & Haas Co.), pp. 1–6.

Primary Examiner—Harold Ansher

[57] ABSTRACT

This invention consists in the application of a neoprene or vinyl covering all around various industrial equipment that is made of metal, such as ladders, cranes, hoists and the like, so that if the equipment accidentally comes into contact with an electrical power, a person using the equipment will not become electrocuted.

1 Claim, 5 Drawing Figures

U.S. Patent    May 17, 1977    4,024,316
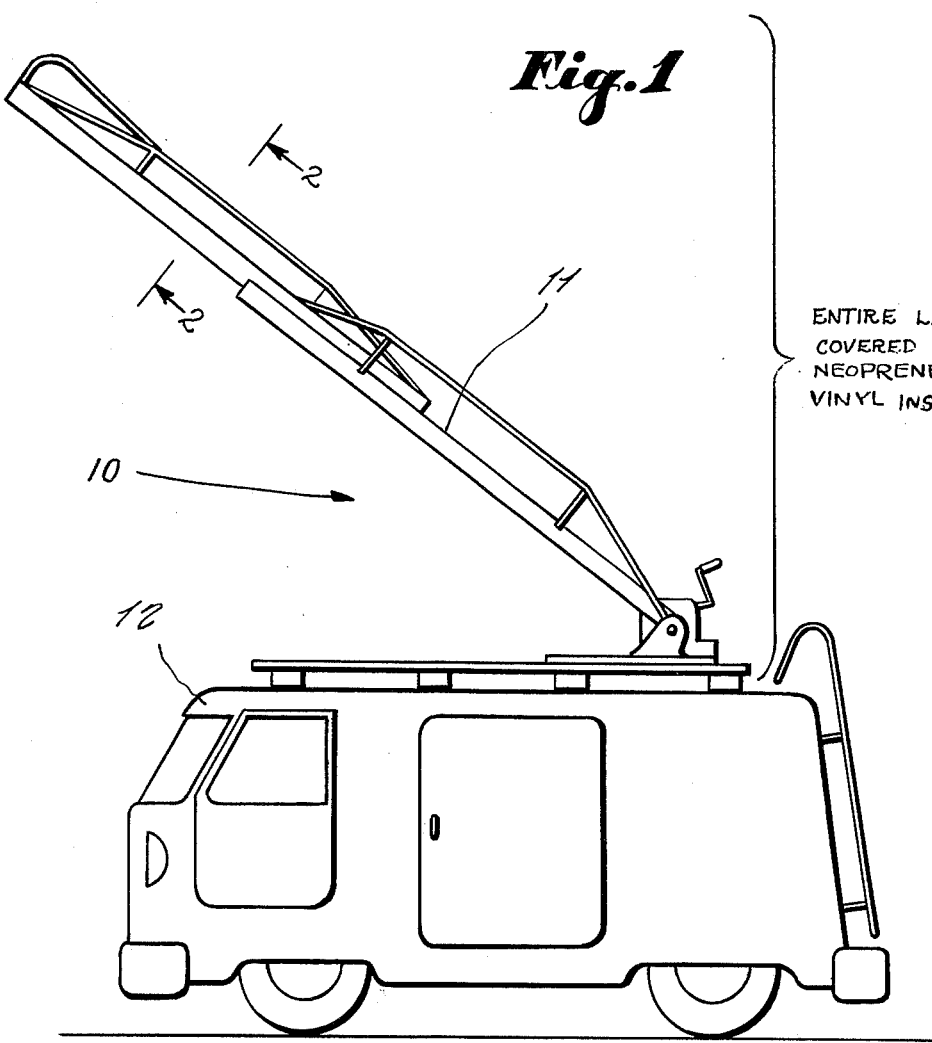
Fig. 1
ENTIRE LADDER COVERED WITH NEOPRENE OR VINYL INSULATION
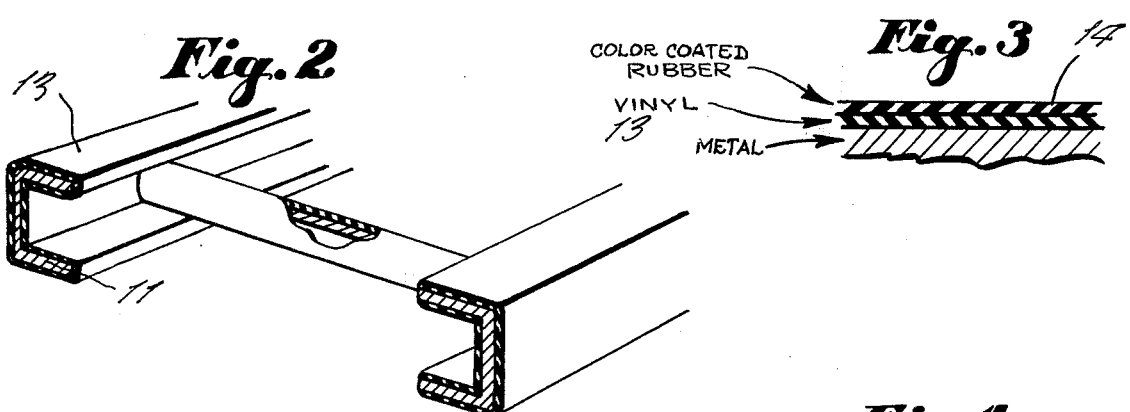
Fig. 2
Fig. 3
COLOR COATED RUBBER
VINYL
METAL
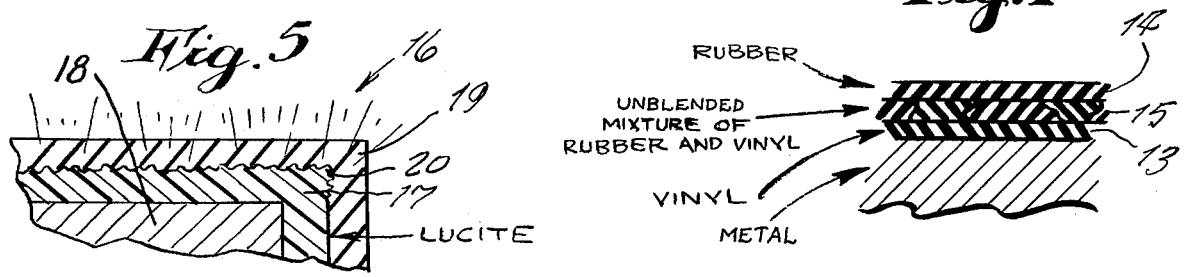
Fig. 5
Fig. 4
RUBBER
UNBLENDED MIXTURE OF RUBBER AND VINYL
VINYL
METAL
LUCITE

INSULATED SAFETYSIZED EQUIPMENT

This invention relates generally to various industrial equipment.

It is generally well known among persons in the specific field of servicemen who service telephone lines and electric power wires upon posts along highways, that they are obliged under rules to keep all metal ladders a minimum safety distance from hot lines so that the ladder or other equipment does not receive an electrical charge which might electrocute the person touching the same. However, many times, such rules are ignored by working men, and sometimes, wires passing through trees' branches and leaves cannot be seen, so that a ladder can accidentally contact the same. These situations are, of course, dangerous and are therefore in want of an improvement.

Accordingly, it is the principal object of the present invention to provide safetysized equipment wherein metal objects such as ladders, cranes, hoists and the like will not receive an electrical charge in case they come into contact with a hot wire.

Another object of the present invention is to provide safetysized equipment which may comprise either large and small cranes, hoists, lifts and chains, steel ropes, shovels, scaffolding, ladders of all kinds, including ladders that are mounted upon trucks of servicemen, or large equipment such as extended cranes mounted with ladders.

Still another object of the present invention is to provide safetysized equipment wherein the equipment may be made of any type of metal such as steel, iron, aluminum, copper, or the like.

Still another object of the present invention is to provide safetysized equipment wherein the entire outer surface of the equipment which might be contacted by a person, is coated with an insulation that comprises either neoprene rubber or vinyl resin.

Other objects are to provide insulated safetysized equipment which is simple in design, inexpensive to manufacture, rugged in construction easy to use and efficient in operation.

These and other objects will be readily evident upon a study of the following specification and accompanying drawing, wherein:

FIG. 1 is a side elevation view of a truck with ladder that is coated with an insulation made either of vinyl resin or neoprene rubber;

FIG. 2 is an enlarged, cross sectional detail of the ladder shown in FIG. 1;

FIG. 3 is an enlarged cross sectional detail in which rubber is coated over the vinyl layer so to make the ladder nonslip in use;

FIG. 4 shows another design in which the construction of a rubber layer over a vinyl layer has a layer therebetween that is an unblended mixture of rubber and vinyl so to firmly anchor and bond the dissimilar components together;

FIG. 5 shows a design in which the insulated equipment is additionally made to glow, in order that it may be seen in a darkness, so that when used by a serviceman on a highway at night, he can climb it more safely even in a darkness.

Referring now to the drawing in greater detail, and more particularly to FIGS. 1 and 2 thereof at this time, the reference numeral 10 represents an insulated safetysized equipment according to the present invention wherein there is shown for example a ladder 11, that is mounted upon a truck 12, such as is used by servicemen who work with power service lines and telephone lines mounted upon posts along highways. Such ladders 11 are generally made of aluminum material, although they can be made of any other metal, so that they are strong.

In the present invention, such metal ladder 11 is coated all around its outer surface by a coating 13 that is made either of neoprene or vinyl, so that in case the ladder comes into contact with a hot wire or other electrical power source, the ladder will not become electrified and thus endanger a person thereupon.

In FIG. 3, a modified design of the invention shows a color coated rubber 14 forming a layer on the outer side of the neoprene or vinyl layer 13 that is described above. Thus the equipment can be readily identified as being of safetysized equipment.

In FIG. 4, the construction shown in FIG. 3 is further modified by incorporating a layer 15 located between the vinyl layer 13 and the rubber layer 14; the intermediate layer 15 consisting of an unblended mixture of the rubber and vinyl in order that the vinyl portion thereof firmly anchors to the vinyl layer 13 while the rubber portion thereof firmly engages to the rubber layer 14, the irregular edges between the rubber and vinyl components in the layer 15 thus firmly mechanically interfit each other in order to form a rigid hold together.

Reference is now made to FIG. 5 wherein there is a modified design of insulated safetysized equipment 16 and which includes a layer 17 located between the equipment metal 18 and the insulated vinyl or neoprene layer 19. In the present invention, the layer 17 consists of a clear lucite acrylic resin plastic which is applied first to the metal and after which the outer surface of the lucite layer 17 is then sandblasted in order to produce a roughened surface as shown at 20. The insulating layer 19 in this form of the invention consists of the same to be transparent and clear. If rubber is used, the same will be of non-slip type. The insulated safetysized equipment thus made has the additional feature of being able to glow in a darkness wherever there is a roughened surface 20 in case one end of the equipment that is unroughened is subjected to a light, so that a person can see the same in a darkness and thus use the equipment more safely. Thus, if the device happens to be a ladder, he can clearly see each ladder rung so that he can see the entire ladder outlined and thus know its precise position.

Thus various forms of insulated safetysized equipment is presented.

While various changes may be made in the detail construction, it is understood that such changes will be within the spirit and scope of the present invention as is defined by the appended claims.

What I now claim is:

1. Insulated Safetysized Equipment, comprising in combination, an equipment such as a ladder, crane, hoist, lift, chain, steel rope, shovel, scaffolding, or the like, said equipment being of metal and having its outer surface covered with a coating of electrical insulated material, said material comprising a transparent, clear layer in which there is an outer film of non-slip rubber, an inner film of vinyl resin, and an unmixed film of non-slip rubber and vinyl resin therebetween; and a layer of clear lucite acrylic resin being between said equipment metal surface and said transparent clear layer, said lucite acrylic resin having a sandblasted, roughened outer surface.

* * * * *